United States Patent [19]

Popp et al.

[11] 3,864,077

[45] Feb. 4, 1975

[54] NON-AQUEOUS DYESTUFFS WITH A PHTHALIC ACID DIALKYL ESTER

[75] Inventors: Gottfried Popp, Cologne; Wolfgang Haebler, Odentha L-Neschen; Wilhelm Gohrbandt, Leverkusen, all of Germany

[73] Assignee: Bayer Aktiengesellschaft, Leverkusen, Germany

[22] Filed: Sept. 1, 1972

[21] Appl. No.: 285,579

[30] Foreign Application Priority Data
Sept. 2, 1971 Germany............................ 2143993

[52] U.S. Cl......................................... 8/173, 8/174
[51] Int. Cl.................................................. D06p 5/04
[58] Field of Search............................... 8/173, 174

[56] References Cited
UNITED STATES PATENTS

| | | |
|---|---|---|
| 3,619,104 | 11/1971 | Diest et al............................ 8/173 X |
| 3,667,899 | 6/1972 | Hartnett et al. ........................ 8/173 |
| 3,682,584 | 8/1972 | Boehmke et al..................... 8/173 X |
| 3,690,815 | 9/1972 | Dellian..................................... 8/173 |

*Primary Examiner*—Leland Sebastian
*Assistant Examiner*—P. A. Nelson
*Attorney, Agent, or Firm*—Plumley & Tyner

[57] ABSTRACT

Dyestuff preparations which contain (a) a water-soluble or water-dispersible dyestuff which is insoluble or sparingly soluble in phthalic acid $C_1$–$C_8$—dialkyl esters, (b) a phthalic acid $C_1$–$C_8$—dialkyl ester and (c) an anionic and/or non-ionic dispersing agent which has a minimum solubility of 1 g per litre of tetrachloroethylene at room temperature, and which are expecially suitable for the preparation of dyebaths of aliphatic halogenated hydrocarbons for dyeing fibre materials.

7 Claims, No Drawings

NON-AQUEOUS DYESTUFFS WITH A PHTHALIC ACID DIALKYL ESTER

The invention relates to dyestuff preparations; more particularly it concerns dyestuff preparations which are characterised in that they contain (a) a water-soluble or water-dispersible dyestuff which is insoluble or sparingly soluble in phthalic acid $C_1-C_8$-dialkyl esters, (b) a phthalic acid $C_1-C_8$-dialkyl ester and (c) an anionic and/or non-ionic dispersing agent which has a minimum solubility of 1 g per litre of tetrachloroethylene at room temperature.

The dyestuff preparations usually contain at least 10 and preferably 20 to 40% of dyestuff, relative to the weight of the dyestuff preparation.

Dyestuffs which can be used for the dyestuff preparations according to the invention are the known water-soluble or water-dispersible dyestuffs provided that they are insoluble or sparingly soluble in the phthalic acid $C_1-C_8$-dialkyl esters. Sparingly soluble dyestuffs are considered to be those of which the solubility at room temperature does not exceed 10 g/kg of phthalic acid $C_1-C_8$-dialkyl ester. In the present application, optical brighteners are also to be understood as dyestuffs.

As examples of the dyestuffs to be used in the dyestuff preparations there should especially be mentioned dispersion dyestuffs and dispersion brighteners and water-soluble dyestuffs and brighteners. The dyestuffs can belong to the most diverse categories of dyestuff, such as to the categories of the diarylmethane, triarylmethane, xanthene, azine, oxazine or thiazine dyestuffs, and especially of the azo, anthraquinone, nitro, phthalocyanine, methine, styryl, stilbene, naphthoperinone, quinophthalone or 5-amino-8-hydroxy-1,4-naphthoquinone-imine dyestuffs.

Preferred azo dyestuffs are monoazo and disazo dyestuffs and their metallised derivatives. As examples of these metallised azo dyestuffs there may be mentioned those in which one copper, chromium or cobalt atom is bonded to a molecule of a monoazo dyestuff or in which one chromium or cobalt atom is bonded to two molecules of identical or different monoazo dyestuffs. The metallised dyestuffs can also contain sulphonic acid or carboxylic acid or sulphonamide groups.

The dyestuffs can furthermore contain fibre-reactive groups, that is to say groups which form covalent bonds with the fibre materials.

The cationic and anionic dyestuffs, as well as the direct dyestuffs, may especially be mentioned as water-soluable dyestuffs.

Possible cationic dyestuffs are methine, azomethine, hydrazone, azacyanine, triarylmethane, xanthene, thioxanthene, acridine, oxazine, thiazine and phenazine dyestuffs, and also the basic dyestuffs of the azo, anthraquinone or phthalocyanine series, such as are listed, for example, in the Colour Index, volume 1, 2nd. edition (1956), pages 1,617–1,654 and in the Supplementary Volume of 1963, and in French Patent Specification No. 1,480,930.

The known acid dyestuffs may especially be mentioned as anionic dyestuffs. Amongst these there may be mentioned the water-soluble dyestuffs, containing up to four sulpho groups, of the azo, anthraquinone, triphenylmethane and phthalocyanine series, such as are listed, for example, in the Colour Index, volume 1, 2nd. edition (1956), pages 1,001–1,404 and in the Supplementary Volume of 1963, pages 4–127.

Further, there should be mentioned 1:1- and 1:2-metal complex dyestuffs, such as are described, for example, in "Fortschritte der chemischem Forschung" ("Advances in Chemical Research"), volume 7, (1967), pages 643–783.

Possible direct dyestuffs are above all disazo, trisazo and polyazo dyestuffs, such as are described, for example, in the Colour Index, volume 2, 2nd. edition (1956), pages 2,001–2,360 and in the Supplementary Volume of 1963, pages 247–332.

By water-dispersible dyestuffs there are understood the customary dispersion dyestuffs such as are described, for example, in the Colour Index, volume 2, 2nd. edition (1956), pages 179–224, but also special dispersion dyestuffs, such as have been described for dyeing from organic, water-immiscible solvents. These special dispersion dyestuffs can be either dyestuffs which are soluble in tetrachloroethylene or dyestuffs which are sparingly soluble or insoluble in tetrachloroethylene. Tetrachloroethylene-soluble dyestuffs are described, for example in German Offenlegungsschriften (German Published Specifications Nos.) 1,930,777, 1,935,483, 1,937,666, 1,939,897, 1,940,184, 1,941,699, 1,942,317, 1,943,235, 1,943,536, 1,943,535, 1,950,493, 1,950,679, 1,954,632, 1,955,071, 1,955,893, 1,958,097, 1,958,664, 1,959,321, 1,959,777, 1,963,357, 1,963,735, 2,000,131, 2,003,708, 2,005,012, 2,017,504, 2,004,131 2,021,521 and 2,040,873; dyestuffs which are sparingly soluble or insoluble in tetrachloroethylene are known, for example, from German Offenlegschriften (German Published Specifications Nos.) 1,932,828, 1,939,095, 1,950,675, 1,952,535, 2,035,728, 2,034,264, 2,113,836, 2,118,019, 2,123,454, 2,124,495 and 2,124,496.

The phthalic acid di-$C_1-C_8$-alkyl esters to be used as organic solvent in the dyestuff preparations according to the invention are phthalic acid dimethyl, diethyl, di-n-propyl, di-i-propyl, di-n-hexyl, di-i-hexyl, di-n-heptyl, di-i-heptyl, di-n-octyl and di-i-octyl esters, as well as the phthalic acid esters of aliphatic $C_4-C_8$-alcohol mixtures. Phthalic acid dibutyl ester has proved particularly suitable.

Examples of anionic dispersing agents which at room temperature have the requisite minimum solubility of 1 g per litre of tetrachloroethylene are: $C_8-C_{20}$-paraffinsulphonates, $C_8-C_{12}$-alkyl-arylsulphonates, $C_8-C_{20}$-alkyl-succinic acid esters, $C_8-C_{20}$-fatty alcohol-sulphuric acid esters, sulphation products of unsaturated oils and fats, and $C_8-C_{20}$-alkyl-phosphoric acid esters. Also, the acid sulphuric acid esters and phosphoric acid esters of polyoxalkylated fatty alcohols, polyols, mercaptans, aliphatic amines and alkylphenols.

As examples of representatives of these anionic dispersing agents there may be mentioned: the monoethanolamine salt of the phosphoric acid ester of the addition product of oleyl alcohol and 6 mols of ethylene oxide; the ammonium salt of the acid sulphuric acid ester of the addition product of 17 mols of ethylene oxide to oleyl alcohol; the sodium salt of dodecylbenzenesulphonic acid and the sodium salt of the phosphoric acid ester of the addition product of 5 mols of ethylene oxide to 2-ethylhexanol.

As examples of non-ionic dispersing agents which at room temperature possess the requisite solubility of 1 g per litre of tetrachloroethylene, there may be mentioned:

a. Polyalkylene glycol compounds, such as polyoxalkylated fatty alcohols, polyoxalkylated polyols, polyoxalkylated mercaptans and fatty amines, polyoxalkylated alkylphenols, (alkyl)-arylphenols and alkylnaphthols, polyoxalkylated alkylarylmercaptans and alkylarylamines, polyoxalkylated fatty acids, naphthenic acids and abietic acids;

b. fatty acid esters of ethylene glycol, propylene glycol and butylene glycol, of glycerine and of polyglycerines and of pentaerythritol, as well as of sugar alcohols, such as sorbitol, sorbitanes and sucrose; also, of novolac ethoxylation products, such as are described in German Offenlegungsschrift (German Published Specification No.) 2,104,202;

c. N-hydroxylalkyl-carbonamides, polyoxalkylated carbonamides and sulphonamides;

d. liquid polyalkylene glycols, especially polyethylene glycols;

e. amine-oxides of the formula

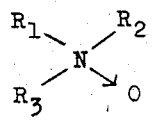

in which
R₁ represents an alkyl, alkenyl or aralkyl radical which possesses 12–28 carbon atoms and is optionally interrupted by oxygen, sulphur and/or nitrogen atoms,
R₂ denotes an alkyl, alkenyl or aralkyl radical which possesses 1–28 carbon atoms and is optionally interrupted by oxygen, sulphur and/or nitrogen atoms and optionally substituted, and
R₃ is an optionally substituted $C_1$–$C_{14}$-alkyl, $C_1$–$C_{14}$-alkenyl, cycloalkyl or aralkyl radical or together with R₃ forms a non-aromatic 5-membered or 6-membered heterocyclic structure,
with the proviso that the sum of the carbon atoms contained in total in R₁, R₂ and R₃ is at least 20 and at most 60, especially amine-oxides of the formula

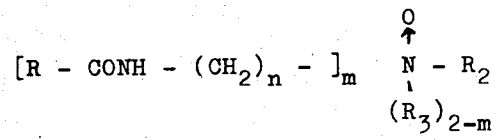

in which
R represents a $C_8$–$C_{28}$-alkyl or alkenyl radical,
R₂ and R₃ independently of one another denote a $C_1$–$C_4$-alkyl radical which is optionally substituted by a chlorine atom or a hydroxyl or nitrile group, or denote a benzyl radical, or together form a morpholine, piperidine or piperazine ring,
$n$ is 2 or 3 and
$m$ is 1 or 2.

As examples of representatives of these non-ionic dispersing agents there may be mentioned: the addition products of 4 to 30 mols of ethylene oxide to 1 mol of 4-nonylphenol; 15 to 40 mols of ethylene oxide to oleyl alcohol or coconut fatty alcohol; 3 to 30 ethylene oxide to oleic acid, ricinoleic acid or coconut fatty acid; 15 to 40 mols of ethylene oxide to castor oil; 20 to 50 mols of ethylene oxide to abietic acid; 10 to 15 ethylene oxide to 4-hydroxydiphenyl or its alkyl or aralkyl derivatives and (0.25 to 4:1) copolymers of propylene oxide and ethylene oxide, oleic acid ethanolamide and amine-oxides of the formulae

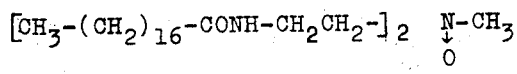

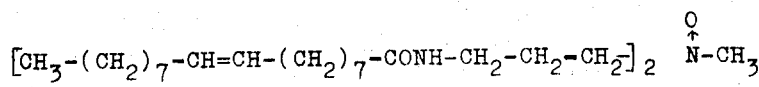

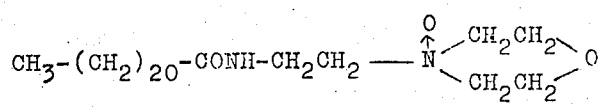

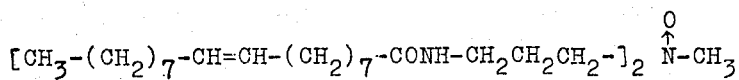

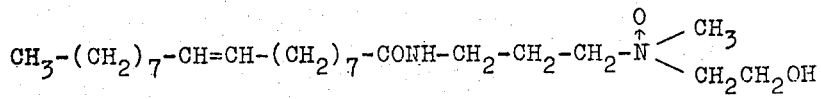

The fatty acid esters of the novolac ethoxylation products have proved particularly suitable as dispersing agents.

To manufacture the dyestuff preparations according to the invention, the phthalic acid dialkyl esters and the anionic and/or non-ionic dispersing agents are employed in such amount that about 0.5 to 10 parts of phthalic acid dialkyl ester and 0.1 to 2 parts of dispersing agent are present per one part of dyestuff.

The dyestuff preparations according to the invention can optionally also contain further additives, such as aliphatic halogenated hydrocarbons, water or aliphatic alcohols.

The dyestuff preparations according to the invention are advantageously manufactured by mixing the components well with one another and carefully grinding or kneading them in a customary comminution machine, for example a stirred ball mill, a steel ball mill or a kneader.

The dyeing preparations according to the invention are outstandingly suitable for the preparation of baths for dyeing textile materials from organic water-immiscible solvents, such as aliphatic halogenated hydrocarbons, especially trichloroethylene, tetrachloroethylene and 1,1,1-trichloropropane. On dilution with halogenated hydrocarbons, for example tetrachloroethylene, they yield dispersions which are still stable even under the dyeing conditions, that is to say at high temperatures. As a result, dyeing with the dyebaths prepared by means of the dyestuff preparations according to the invention yields dyeings of excellent evenness and avoids contamination of the dyeing apparatus through precipitation of the dyestuffs.

The dyestuff preparations according to the invention are furthermore distinguished by good flow and excellent storage stability.

Dyestuff preparations for dyeing textile materials from organic water-immiscible solvents are already known. In these preparations, the following are proposed as organic solvents: phosphorus derivatives, such as hexamethylphosphoric acid triamide, or oils, such as petroleum fractions, silicone oils, liquid fatty acids, fully or partially halogenated hydrocarbons, liquid fatty acid amides and animal and vegetable oils; further, water-miscible organic solvents, such as dioxane, tetrahydrofurane, glycerine-formal, acetonitrile, pyridine, ethylene glycol monomethyl, ethyl and butyl ethers, ethylene carbonate, γ-butyrolactone, dimethylformamide, dimethylacetamide, sulpholane and dimethylsulphoxide; or organic solvents which only take up small amounts of water, such as benzine-hydrocarbons, benzene, trichloroethylene and tetrachloroethylene; or organic solvents, such as furfuryl alcohol and tetrahydrofurfuryl alcohol, cyclohexanone or butyl acetate.

These known preparations however suffer from serious disadvantages: either their storage stability is inadequate or their handling is too hazardous because of the ready inflammability of the solvents used in them, or the preparation of the dyebaths produced using these known preparations entails great difficulty since the organic solvents cannot be separated from the dyebath halogenated hydrocarbons, or incombustible residues result on working-up the dyebaths by distillation.

All these disadvantages are avoided when using the dyestuff preparations according to the invention. These ensure that they can be handled without hazard, because of the low inflammability of the phthalic acid esters used in them; when working-up the dyebaths, easy and complete separation of the esters from the dyebath halogenated hydrocarbons is achieved in a simple fashion; additionally, on working-up the dyebaths by distillation, an easily combustible residual sludge is obtained.

The halogenated hydrocarbon dyebaths manufactured by means of the dyestuff preparations according to the invention are suitable for dyeing all fibre materials which can be dyed with the dyestuffs contained in the dyestuff preparations, viz. fibre materials of cellulose, for example cotton, or regenerated cellulose, such as viscose and rayon; polyacrylonitrile; polyesters, such as celluose 2½-acetate or cellulose triacetate, and polyesters such as polyethylene glycol terephthalate, or polyesters from 1,4-bis-(hydroxymethyl)-cyclohexane and terephthalic acid; and polyamides, such as natural polyamides, for example wool and silk, and synthetic polyamides, such as polyhexamethylenediamine adipate, polycaprolactam or poly-ω-aminoundecanoic acid; or polyurethanes.

The parts indicated in the examples which follow are parts by weight, unless otherwise stated; the dyestuff numbers relate to the data in the Colour Index, 2nd. edition (1956), volume 3.

EXAMPLE 1

10 parts of the dispersion dyestuff

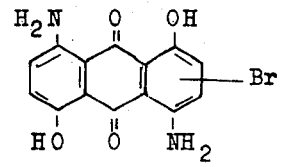

are ground in a stirred ball mill with 10 parts of the non-ionic dispersing agent described below and 80 parts of phthalic acid dibutyl ester. The resulting dispersion is easily pourable and has excellent storage stability.

The dispersing agent used was obtained as follows: 315 parts of the polyethylene glycol ether obtained by ethoxylation of a novolac (phenol:formaldehyde = 2:1.6) with 3 mols of ethylene oxide per mol of OH group are boiled with 141 parts of oleic acid and 200 ml of xylene under a water separator, whilst stirring, until no further water separates off. Thereafter the xylene is distilled off. The dispersing agent is obtained in the form of a viscous yellowish liquid (acid number 10).

On diluting the resulting dyestuff preparation with tetrachloroethylene, a stable dispersion is obtained, which is very suitable for dyeing synthetic polyamide fibre materials by the exhaustion process.

100 parts of a polyamide fabric are introduced, without prior cleaning, into a dyebath at room temperature which has been prepared by diluting 10 parts of the dyestuff preparation described with 1,600 parts of tetrachloroethylene. The bath is heated to 100°C over the course of 10 minutes with vigorous circulation of the liquor and is kept at this temperature for 30 minutes. The liquor is then separated off and the dyed goods are rinsed with fresh solvent which contains per litre of tetrachloroethylene 0,2 parts of bis-octadecyl-dimethyl-ammonium chloride for 5 minutes at about 40°C. After separating off the rinsing liquor, the dyed goods are centrifuged and dried in a stream of air. A uniform, strong blue dyeing is obtained, which is distinguished by good fastness to light, washing and sublimation.

An equivalent dyestuff preparation was obtained if instead of the dispersion dyestuff used, the same amount of one of the following dispersion dyestuffs was employed:

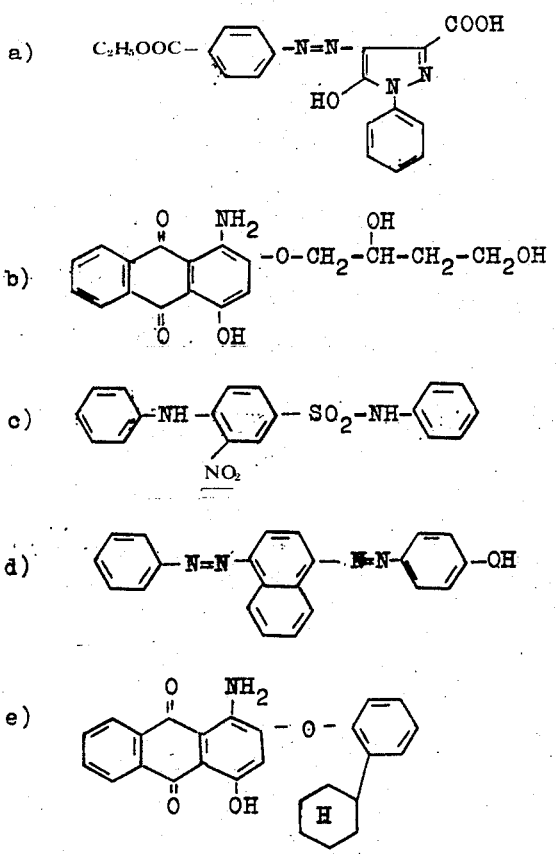

EXAMPLE 2

20 parts of the dispersion dyestuff

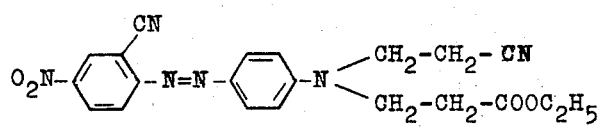

are ground for 16 hours in a steel ball mill with 10 parts of the 1:1 mixture of the amine-oxides of the formula

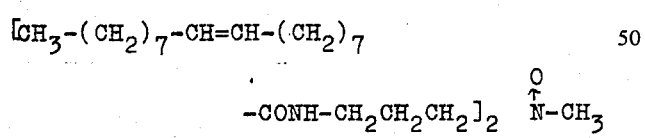

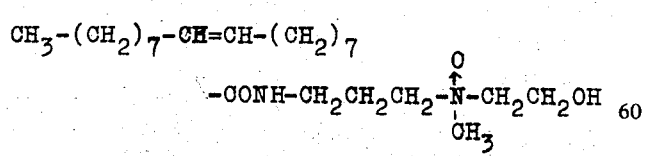

and 10 parts of the novolac polyethylene glycol ether monocarboxylic acid ester described below and 60 parts of phthalic acid dimethyl ester. A finely divided mobile dispersion is obtained which is distinquished by very good storage stability.

The novolac polyethylene glycol ether monocarboxylic acid ester dispersing agent used was obtained as follows: 350 parts of the polyethylene glycol ether obtained by ethoxylation of a novolac (para-cresol:formaldehyde = 2:1.5) with 3 mols of ethylene oxide per mol of OH group were boiled with 141 parts of oleic acid and 200 ml of xylene under a water separator, whilst stirring, until no further water separated off. Thereafter, the xylene was distilled off. The dispersing agent is obtained in the form of a viscous yellowish oil.

On diluting the resulting dyestuff preparation with tetrachloroethylene, a stable dispersion is obtained, which is very suitable for dyeing polyethylene terephthalate fibres by either the exhaustion process or the impregnation process.

100 parts of a fabric of texturised polyethylene terephthalate fibres are introduced at room temperature, without prior purification, into a dyebath which has been prepared by diluting 5 parts of the dyestuff preparation with 1,600 parts of tetrachloroethylene. The bath is heated to 120°C over the course of 10 minutes, with vigorous circulation of the liquor, and is kept at this temperature for 30 minutes. The liquor is then separated off and the dyed goods are rinsed for 5 minutes with fresh solvent, which contains per litre of tetrachloroethylene 0,5 parts of bis-octadecyl-dimethyl-ammoniumchloride at about 40°C. After separating off the rinsing liquor, the dyed goods are centrifuged and dried in a stream of air. A uniform strong red dyeing is obtained. The dyeing is distinguished by good fastness to light, washing and sublimation.

An equivalent red dyeing can also be produced according to the impregnation process. For this purpose, 50 parts of the dyestuff preparation are diluted with 1,600 parts of tetrachloroethylene and the polyester fabric is padded with the liquor thus obtained. After drying for 15 seconds at 100°C, the dyestuff is fixed by a heat treatment at 190°C, lasting 45 seconds. Thereafter, the fabric is washed with pure tetrachloroethylene at room temperature.

An equivalent dyestuff preparation was obtained if instead of the dispersion dyestuff used the same amount of one of the following dispersion dyestuffs was employed:

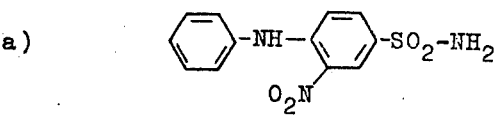

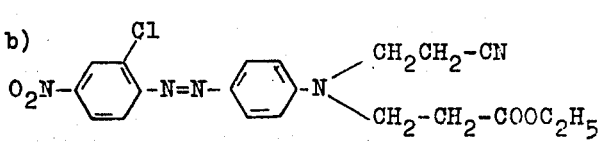

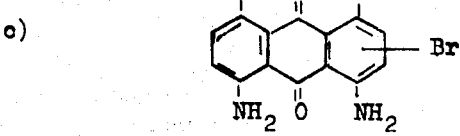

d) 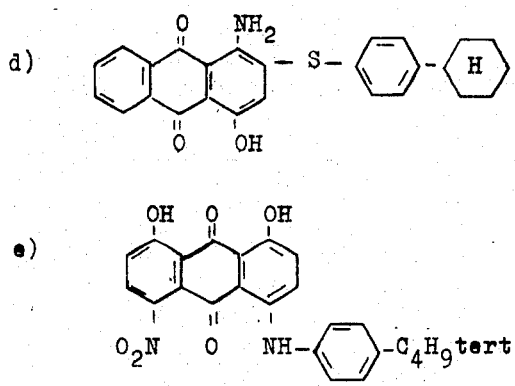

e)

EXAMPLE 3

12 parts of the dyestuff described in Example 2 of Belgian Patent Specification No. 696,438 are ground with 6 parts of the reaction product of 1 mol of nonylphenol with 6 mols of ethylene oxide and 3 parts of oleic acid ethanolamide and 39 parts of phthalic acid diethyl ester in a stirred ball mill. A finely divided mobile dispersion is obtained, which is distinguished by very good storage stability.

On diluting the dyestuff preparation with tetrachloroethylene, a stable dispersion is obtained which is very suitable for dyeing polyamide fibre materials.

100 parts of polyamide fibre yarn are introduced into a dyebath at 22°C, which has been prepared from 5 parts of the dyestuff preparation, 1.5 parts of oleic acid ethanolamide, 1.5 parts of oleyl alcohol eicosaethylene glycol ether, 6 parts of water and 1,600 parts of tetrachloroethylene. The bath is warmed to 100°C over the course of 20 minutes, with the appartus closed, and is kept at this temperature for 45 minutes. After separating off the dyeing liquor and rinsing with fresh tetrachloroethylene, the dyed goods are freed of the adhering solvent by suction-filtration and drying in a stream of air. A uniform strong red dyeing is obtained, which is distinguished by very good wet fastness properties.

If the dyestuff in the dyestuff preparation is replaced by the same amount of the dyestuff described in Example 1 of British Patent Specification No. 1,207,520, a dyestuff preparation is obtained which is also outstandingly suitable for dyeing polyamide materials.

Equivalent dyestuff preparations were furthermore obtained if instead of the chromium complex dyestuff used, the same amount of one of the following metal complex dyestuffs was employed:

a) 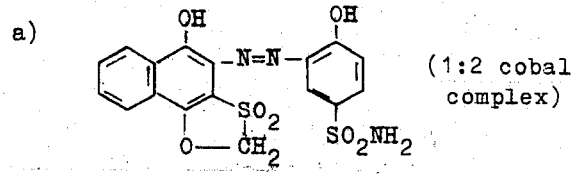 (1:2 cobalt complex)

b) 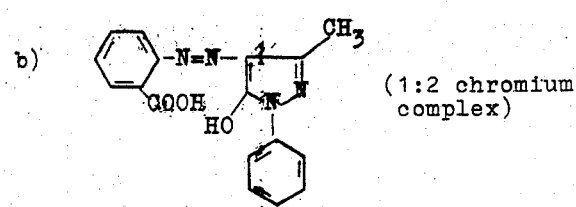 (1:2 chromium complex)

EXAMPLE 4

12 parts of the dyestuff

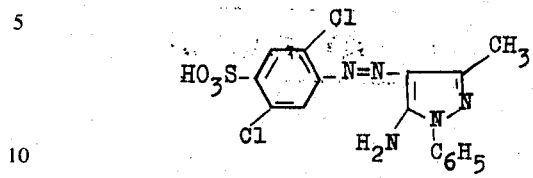

are kneaded with 6 parts of the ethanolamine salt of dodecylbenzenesulphonic acid, 6 parts of the reaction product of 1 mol of p-nonylphenol with 10 mols of ethylene oxide and 38 parts of phthalic acid diethyl ester in a four-screw kneader. A finely divided mobile dyestuff dispersion is obtained, which is distinguished by excellent storage stability.

5 parts of the dyestuff preparation, 1.5 parts of oleic acid ethanolamide, 1.5 parts of oleyl alcohol eicosaethylene glycol ether, 6 parts of water and 1,600 parts of tetrachloroethylene yield a dyeing liquor which is very suitable for dyeing synthetic polyamide by the exhaustion process, as described in Example 3. A strong uniform yellow dyeing is obtained.

If, in this liquor, the amount of oleic acid ethanolamide is increased to 3 parts and the amount of water to 18 parts, a dyeing liquor is obtained which is very suitable for dyeing wool by the exhaustion process.

An equivalent dyeing preparation was obtained if instead of the acid dyestuff used, the same amount of one of the following acid dyestuffs was employed:

a) 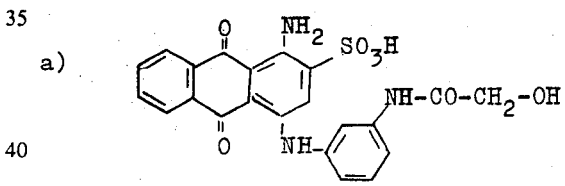

b. C. I. No. 17,070
c. C. I. No. 18,835
d. C. I. No. 14,690
e. C. I. No. 61,590

EXAMPLE 5

12 parts of the dyestuff

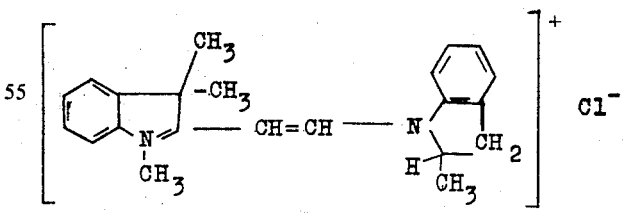

are ground with 6 parts of the novolac polyethylene glycol ether monocarboxylic acid ester dispersing agent described in Example 2 and 42 parts of phthalic acid dibutyl ester in a stirred ball mill. The resulting finely divided liquid dispersion is acidified with glacial acetic acid. A dispersion of excellent storage stability is obtained.

Equivalent dyestuff preparations are also obtained on grinding the following components:

Dyestuff preparation 5a:

12 parts of the dyestuff of the formula

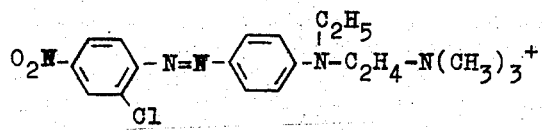

6 parts of the reaction product of 1 mol of sorbitol trioleate with 15 mols of ethylene oxide, 3 parts of oleic acid ethanolamide and 39 parts of phthalic acid di-i-octyl ester.

Dyestuff preparation 5b:

12 parts of the dyestuff

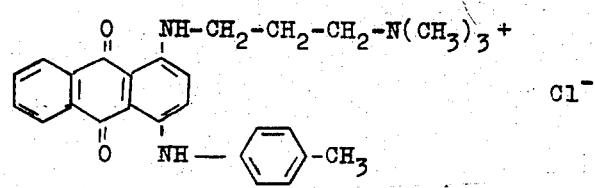

6 parts of the reaction product of 1 mol of beef tallow with 3 mols of ethylene oxide and 42 parts of phthalic acid diethyl ester.

On diluting the dyestuff preparations described with tetrachloroethylene, dyeing liquors are obtained which are very suitable for dyeing polyacrylonitrile fibre materials and base-modified polyester materials in accordance with the exhaustion process.

EXAMPLE 6

20 parts of the dyestuff C.I. No. 35,780 are ground with 10 parts of the novolac polyethylene glycol ether monocarboxylic acid ester dispersing agent described in Example 3 and 70 parts of phthalic acid dibutyl ester in a stirred ball mill. A finely divided mobile dyestuff preparation is obtained, which is distinguished by very good storage stability.

On diluting the dyestuff preparation with tetrachloroethylene, a stable dispersion is obtained, which is very suitable for dyeing cotton fibre materials.

100 parts of heavy cotton cloth are introduced into a dyebath at 22°C which has been prepared from 5 parts of the dyestuff preparation, 1,600 parts of tetrachloroethylene, 3 parts of oleic acid ethanolamide, 3 parts of oleyl alcohol eicosaethylene glycol ether and 25 parts of water. The bath is warmed to 100°C over the course of 20 minutes with the vessel closed and is kept at this temperature for 30 minutes. After cooling, the liquor is separated off and the dyed goods are rinsed with fresh solvent. A uniform strong red dyeing is obtained, which is distinguished by very good fastness properties.

EXAMPLE 7

12 parts of the dyestuff

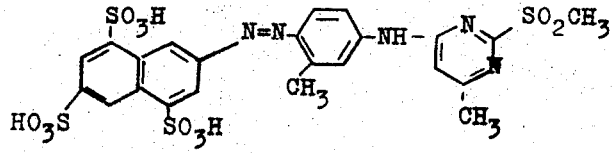

6 parts of oleic acid ethanolamide, 6 parts of the calcium salt of dodecylbenzenesulphonic acid and 36 parts of phthalic acid diisobutyl ester are ground in a stirred ball mill. A finely divided mobile dyestuff preparation is obtained, which is distinguished by very good storage stability.

$CH_3SO_4^-$

On diluting the preparation with tetrachloroethylene, a stable dispersion is obtained, which is very suitable for dyeing cellulose fibre materials both by the exhaustion process and by the impregnation process.

a. 100 parts of heavy cotton cloth are introduced into a dyebath at room temperature which has been prepared from 3 parts of the dyestuff preparation, 6 parts of oleyl alcohol eicosaethylene glycol ether, 50 parts of water, 5 parts of sodium carbonate and 2,000 parts of tetrachloroethylene. The fabric is dyed for 45 minutes at 40° to 50°C and after separation from the dyeing liquor is rinsed with a tetrachloroethylene-water emulsion. A uniform strong yellow dyeing is obtained.

b. Cotton twill is padded with a liquor (liquor uptake: 100% of the weight of the goods) which has been prepared from 30 parts of the dyestuff preparation, 5 parts of oleyl alcohol eicosaethylene glycol ether, 150 parts of water in which 10 parts of sodium carbonate have first been dissolved, and 1,600 parts of tetrachloroethylene. Thereafter the fabric is dried for 60 seconds at 80° to 100°C. After fixing the dyestuff by 60 seconds' heat treatment at 180°C, the fabric is rinsed with a tetrachloroethylene-water emulsion. A strong yellow dyeing of a high degree of fixing is obtained.

Equivalent dyestuff preparations were obtained if instead of the dyestuff used, the same amount of one of the following dyestuffs was employed:

a) 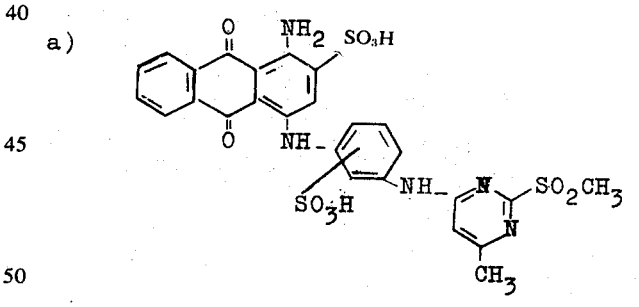

b) 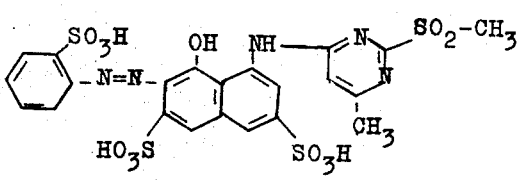

c) 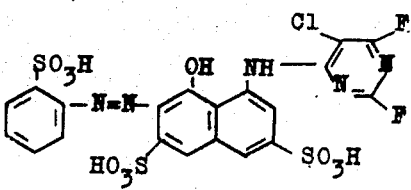

d) 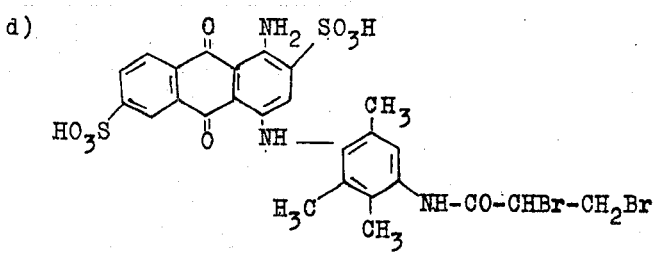

EXAMPLE 8

20 parts of the white toner of the formula

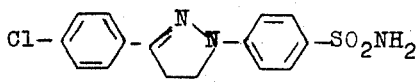

are ground in a stirred ball mill with 10 parts of the non-ionic dispersing agent described in Example 1 and 70 parts of phthalic acid dibutyl ester. The resulting white toner dispersion is easily pourable and has excellent storage stability.

a. 100 parts of a polyamide fabric are introduced into a dyebath at room temperature which has been prepared from 1 part of the white toner dispersion, 1.5 parts of oleic acid ethanolamide, 1.5 parts of oleyl alcohol eicosaethylene glycol ether, 6 parts of water and 1,600 parts of tetrachloroethylene. The bath is warmed to 100°C in a closed apparatus over the course of 15 minutes and is kept at this temperature for 30 minutes. After separating off the dyeing liquor and rinsing with fresh tetrachloroethylene, the dyed goods are freed of the adhering solvent by suction filtration and drying in a stream of air. A uniform brilliant white shade having good fastness properties is obtained.

b. 100 parts of a polyamide fibre fabric are introduced into a dyebath at room temperature which has been prepared from 1 part of the white toner dispersion described above and 1,600 parts of tetrachloroethylene. The dyebath is heated to 80°C over the course of 10 minutes and is kept at this temperature for 30 minutes. During this time, steam is blown into the dyeing apparatus by means of a suitable device, as a result of which an amount of moisture sufficient for dyeing is maintained in the dyeing liquor. A uniform brilliant white shade with good fastness properties is again obtained.

c. Knitted polyamide goods are padded or sprayed with a liquor (liquor uptake 80% of the weight of the goods) which has been prepared from 15 parts of the white toner dispersion described above and 1,600 parts of tetrachloroethylene. The knitted fabric is subsequently dried for 30 to 60 seconds at 80°–100°C and is thereafter subjected to a 30 seconds' dry heat treatment at 180°C. After rinsing with fresh tetrachloroethylene and drying, a brilliant white shade having good fastness properties is obtained.

We claim:

1. A storage-stable non-aqueous dyestuff dispersion consisting essentially of
   a. a phthalic acid $C_1$–$C_8$-dialkyl ester;
   b. a water-soluble or water-dispersible dyestuff which is insoluble or sparingly soluble in phthalic acid $C_1$–$C_8$-dialkyl ester; and
   c. an anionic dispersing agent, a non-ionic dispersing agent, or a mixture of anionic and non-ionic dispersing agent having a minimum solubility of 1 g per litre of tetrachloroethylene;
   said composition containig 10 to 40% of dyestuff, which dispersion is obtained by grinding or kneading said components (a), (b) and (c) together.

2. The storage-stable non-aqueous dyestuff dispersion of claim 1 in which the ratio (a) phthalic acid $C_1$–$C_8$-dialkyl ester: (c) dispersion agent: (b) dyestuff is 0.5:0.1:1 to 10:2:1.

3. The storage-stable non-aqueous dispersion of claim 2 in which (a) the phthalic acid $C_1$–$C_8$-dialkyl ester is dibutyl phthalate.

4. A storage-stable non-aqueous dyestuff dispersion consisting essentially of
   a. a phthalic acid $C_1$–$C_8$-dialkyl ester;
   b. a water-soluble or water-dispersible dyestuff which is insoluble or sparingly soluble in phthalic acid $C_1$–$C_8$-dialkyl ester; and
   c. an anionic dispersing agent, a non-ionic dispersing agent, or a mixture of anionic and non-ionic dispersing agent having a minimum solubility of 1 g per litre of tetrachloroethylene;
   in which the ratio of (a) phthalic acid $C_1$–$C_8$-dialkyl ester: (c) dispersing agent: (b) dyestuff is 0.5:0.1:1 to 10:2:1; which dispersion is obtained by grinding or kneading (a), (b) and (c) together.

5. The storage-stable non-aqueous dyestuff dispersion of claim 4 in which (a), the phthalic acid $C_1$–$C_8$-dialkyl ester is dibutyl phthalate.

6. The storage-stable non-aqueous dyestuff dispersion of claim 4, which contains, in addition, an aliphatic halogenated hydrocarbon.

7. The storage-stable non-aqueous dyestuff dispersion of claim 6 in which said aliphatic halogenated hydrocarbon is trichloroethylene, tetrachloroethylene or 1,1,1-trichloropropane.

* * * * *